United States Patent Office
3,754,022
Patented Aug. 21, 1973

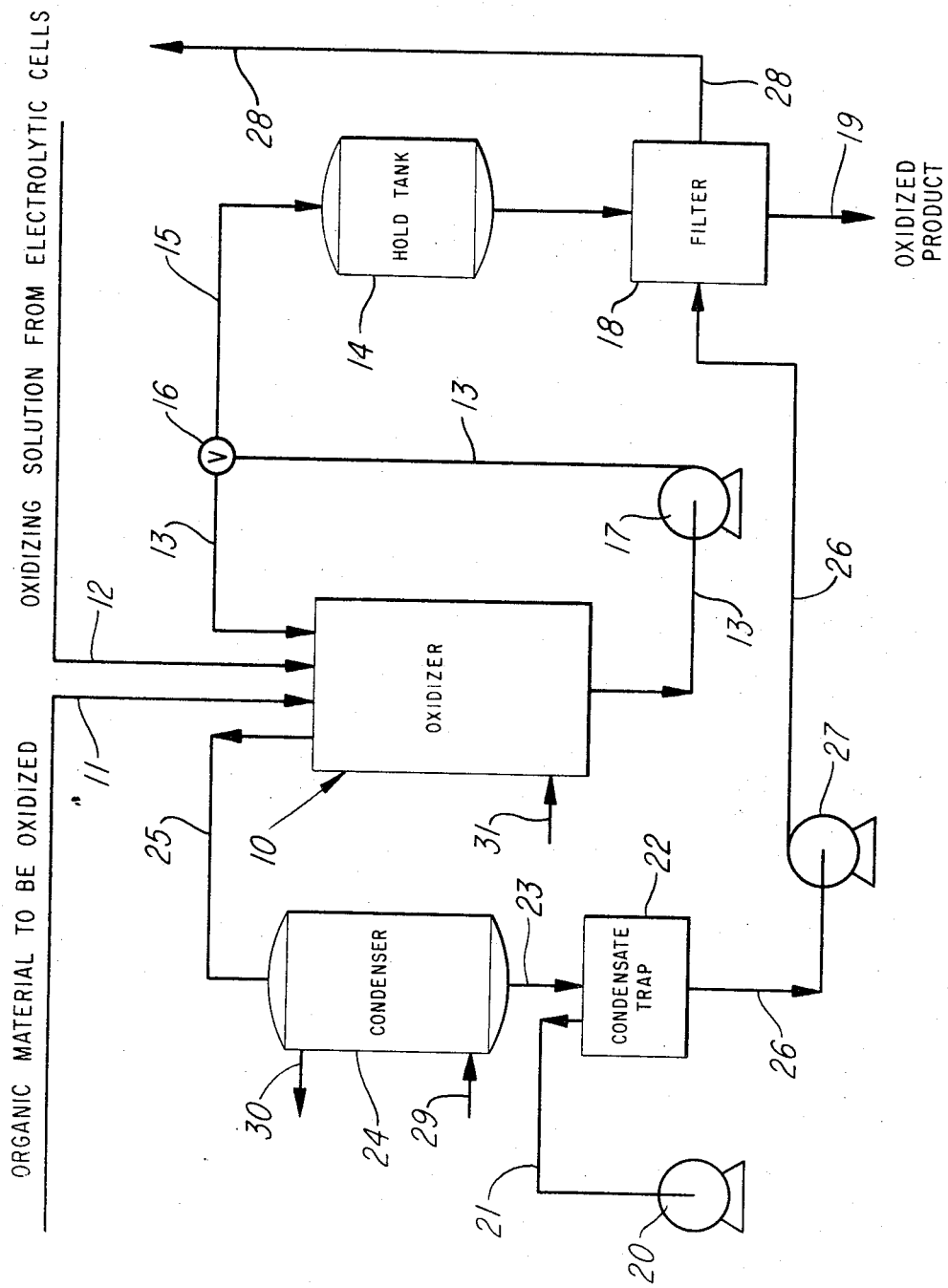

3,754,022
PROCESS FOR OXIDATION WITH CHROMIC ACID
Edward A. Kling, and James L. Cousino, Muskegon, Mich., and James A. Frens, Houma, La., assignors to Lakeway Chemicals, Inc., Muskegon, Mich.
Filed June 12, 1970, Ser. No. 45,789
Int. Cl. C07c 63/02, 101/42
U.S. Cl. 260—518 R        7 Claims

ABSTRACT OF THE DISCLOSURE

Organic materials are oxidized with an aqueous oxidizing solution of chromic acid and sulfuric acid by admixing the organic material with the oxidizing solution in a relatively dilute form and then concentrating the oxidizing solution in situ by evaporation. The spent oxidizing solution is regenerated electrolytically.

BACKGROUND OF THE INVENTION

It is known to oxidize organic materials with powerful oxidizing agents such as aqueous solutions containing chromic acid in admixture with sulfuric acid. Such oxidizing agents are normally regenerated electrolytically and used many times over. However, due to the strong oxidizing and corrosive nature of the agents and the limited ability of electrolytic cells to withstand the attendant corrosion, oxidation of organic materials heretofore has been carried out with relatively dilute oxidizing solutions. Nevertheless in many applications it is desirable to carry out the oxidation at relatively high chromic acid and sulfuric acid concentrations.

Moreover, the oxidative reaction is exothermic in nature and substantial amounts of heat, resulting in undesirable high reaction temperatures, are usually generated. The prior art oxidation processes have attempted to cope with this problem by providing cooling means such as cooling coils within the reaction vessel and/or by jacketing the reaction vessel and passing a cooling fluid therethrough.

It is an object of the present invention to provide an oxidation process for organic materials whereby the aforementioned difficulties are obviated or at least substantially minimized. It is a further object to provide a process whereby the heat generated during the reaction is effectively removed without the need of auxiliary cooling means such as cooling coils or the like within the reaction vessel. Still other objects will readily present themselves to one skilled in the art upon reference to the ensuing specification, the drawing, and the claims.

SUMMARY OF THE INVENTION

The present invention contemplates an oxidative process whereby organic materials are treated with an aqueous oxidizing solution comprising chromic acid and sulfuric acid. The process can be continuous or batch and comprises admixing the organic material with the oxidizing solution in a relatively dilute form such as can be readily derived from an electrolytic regeneration cell. Thereafter the dilute oxidizing solution is concentrated in situ by boiling off excess water and the oxidation carried out while the oxidizing solution is maintained substantially at its boiling point. After oxidation, the spent oxidizing solution containing chromium sulfates is recovered and can be electrolytically regenerated after a suitable dilution.

BRIEF DESCRIPTION OF THE DRAWING

The drawing is a flow diagram illustrating the process of this invention.

DESCRIPTION OF THE PREFERRED EMBODIMENT

Referring to the drawing, organic material to be oxidized is fed to oxidizer 10 through process feed line 11 and an aqueous oxidizing solution containing chromic acid and sulfuric acid is fed to oxidizer 10 through line 12. Oxidized product together with spent or partially spent oxidizing solution containing a relatively high concentration of chromium sulfate is withdrawn from oxidizer 10 and by means of line 13 and pump 17 is recycled to oxidizer 10 and/or transported to hold tank 14, through line 15. Valve 16 at the junction of lines 13 and 15 regulates the amount recycled and the amount transported to hold tank 14 and further to filter 18 where the oxidized product is separated from the spent oxidizing solution and withdrawn through line 19. If it is desired to operate a batch process, all of the reaction products withdrawn from oxidizer 10 are first recycled and then, after a predetermined time period pumped over to hold tank 14 and filtered. If, on the other hand, the oxidation is carried out as a continuous process, a portion or none of the withdrawn reaction products can be recycled and the remainder pumped over to hold tank 14 and processed further.

Pressure within oxidizer 10 is usually subatmospheric and is regulated and maintained by means of vacuum pump 20 or the like which communicates with oxidizer 10 via line 21, trap 22, line 23, condenser 24, and line 25. Inasmuch as the oxidation reaction within oxidizer 10 is exothermic, the generated heat is utilized to concentrate the relatively dilute oxidizing solution from electrolytic cells by boiling off the excess water. The water that is boiled off is removed through line 25, condensed in condenser 24 and transported by means of lines 23 and 26, and pump 27, to filter 18 where the condensate is used for washing the oxidized product and at the same time dilutes the spent oxidizing solution which is then returned to suitable electrolytic cells for regeneration and reuse by means of line 28. If additional dilution of the spent oxidizing solution is necessary, make-up water can be added at this time. Condenser 24 is cooled by circulating a suitable heat exchange fluid therethrough by means of lines 29 and 30, if necessary.

The oxidation temperature within oxidizer 10 can vary, depending on the concentration of the oxidizing solution and also on the organic material to be oxidized. Usually the temperature ranges from about 50° C. to about 100° C. Oxidizer 10 is maintained at the desired temperature by controlling the pressure therewithin by means of vacuum pump 20. The heat of evaporation of the water driven off from the boiling admixture of the organic material and the aqueous oxidizing solution is usually sufficient to maintain process temperature within the desired range. In the event the temperature within oxidizer 10 falls below the desired value, steam can be introduced into oxidizer 10 through line 31, the pressure can be increased somewhat, or both of the foregoing temperature control means can be utilized.

By maintaining a substantially constant reduced pressure within oxidizer 10 the concentration of the oxidizing solution is very effectively maintained at a substantially constant level. For the oxidation of aromatic hydrocarbons such as o-toluene sulfonamide and p-nitrotoluene the sulfuric acid concentration of the oxidizing solution must be at least 12 N. Preferably the sulfuric acid concentration is about 14 N and the chromic acid content about 6 percent by weight.

A further advantage that is gained by maintaining the oxidizing solution substantially at its boiling point during oxidation is improved agitation which disperses the reactants and results in a much more uniform reaction rate throughout oxidizer 10 than would otherwise be attainable. Moreover, the boiling solution minimizes the possibility of localized hot spots within oxidizer 10 and the attendant charring of the organic material that is being oxidized.

Additionally, the present process minimizes freezing throughout the entire process system because only relatively dilute acid solutions have to be transported about, which solutions are concentrated to the desired strength within the reaction vessel, i.e., oxidizer 10.

The present invention is further illustrated by the following examples.

Example 1.—Oxidation of ortho-toluene sulfonamide

An aqueous solution (1600 grams) containing hydrated chromic sulfate, $Cr_2(SO_4)_3 \cdot 18H_2O$, (600 grams/liter), and 14 N sulfuric acid is heated in a suitable reactor vessel to a temperature of about 60° C. under a pressure of about 29 millimeters of mercury, absolute. When a steady state of boiling is achieved, o-toluene sulfonamide (about 100 grams) is added to the boiling solution together with an oxidizing solution of aqueous 8 N sulfuric acid containing chromic acid, $CrO_3$, (90 grams/liter). The relative amounts added are such that the ratio of $CrO_3$ to o-toluene sulfonamide is about 1.5:1. Reduced pressure is maintained above the resulting reaction admixture and water is removed therefrom by vacuum distillation at a rate sufficient to maintain the admixture at a temperature in the range from about 58° C. to about 62° C.

A mixture of the reaction products and spent oxidizing solution is continuously drawn off from the vessel at the same rate as fresh oxidizing solution and o-toluene sulfonamide are added. The withdrawn mixture is cooled, diluted with water to a sulfuric acid concentration of about 8 N, and filtered. A crude oxidized o-toluene sulfonamide product is recovered from the filter, and the filtrate is returned to electrolytic cells for regeneration.

The crude oxidized product is subsequently purified, and oxidized o-toluene sulfonamide product in about 86 percent yield is obtained.

Example 2.—Oxidation of para-nitrotoluene

An aqueous solution (600 grams) of 40 weight percent sulfuric acid and containing hydrated chromic sulfate, $Cr_2(SO_4)_3 \cdot 18H_2O$, (about 500 grams/liter) is heated in a suitable reactor vessel to a temperature of about 95° C. under a pressure of about 400 millimeters of mercury, absolute.

When a steady state of boiling is achieved, p-nitrotoluene (about 46 grams) and an oxidizing solution of aqueous 8 N sulfuric acid (about 104 grams) containing chromic acid, $CrO_3$, (about 90 grams/liter) is added to the boiling solution over a time period of about three hours. After the aforesaid initial heat-up period oxidation temperature of about 95° C. is sustained by the generated heat of reaction and is maintained at that level by evaporation and removal of excess water from the reaction vessel. At the same time the sulfuric acid concentration is maintained relatively constant at about 14 N during the reaction.

A mixture of the reaction products and spent oxidizing solution is continuously withdrawn from the reactor vessel, cooled to about 40° C., diluted with water to a sulfuric acid concentration of about 8 N, and filtered. A crude oxidized p-nitrotoluene product is recovered from the filter, and the filtrate is returned to electrolytic cells for regeneration.

The crude oxidized product is subsequently purified and oxidized p-nitrotoluene product in about 90 percent yield is obtained.

The foregoing discussion, the drawing, and the examples are intended as illustrative. Still other variations within the spirit and scope of this invention will readily present themselves to one skilled in the art.

We claim:
1. In an oxidative process for the oxidation of organic materials with an aqueous oxidizing solution of chromic acid and sulfuric acid which requires a high concentration of oxidizing acid and wherein spent oxidizing solution is regenerated electrolytically in relatively dilute form, the steps of
   (a) admixing organic material to be oxidized selected from nitrotoluene and toluenesulfonamide with the oxidizing solution from said regeneration step in said relatively dilute form;
   (b) concentrating said oxidizing solution in situ by boiling off excess water at a subatmospheric pressure;
   (c) maintaining the oxidizing solution at a subatmospheric pressure and substantially at its boiling point while in contact with the organic material to be oxidized; and
   (d) recovering spent oxidizing solution from the mixture of reaction products, electrolytically regenerating the same in relatively dilute form, and returning the thus regenerated oxidizing solution to step (a) of the process.

2. The process in accordance with claim 1 wherein the oxidizing solution is diluted after oxidation but prior to electrolytic regeneration.

3. The process in accordance with claim 1 wherein the oxidizing solution is concentrated at least until the sulfuric acid concentration therein reaches 12 N.

4. The process in accordance with claim 1 wherein during oxidation composition of the oxidizing solution is maintained at about 14 N relative to sulfuric acid.

5. The process in accordance with claim 1 wherein the organic material is o-toluene sulfonamide.

6. The process in accordance with claim 1 wherein the organic material is p-nitrotoluene.

7. The process in accordance with claim 1 wherein the oxidation is carried out at a temperature in the range from about 50° C. to about 100° C. and at a subatmospheric pressure.

References Cited
UNITED STATES PATENTS

| | | | |
|---|---|---|---|
| 1,998,925 | 4/1935 | Demant | 260—524 |
| 1,458,715 | 6/1923 | Lloyd et al. | 260—524 |
| 1,458,491 | 6/1923 | McKee et al. | 260—524 |
| 3,423,300 | 1/1969 | Joo et al. | 204—89 |

FOREIGN PATENTS

| | | | |
|---|---|---|---|
| 842,998 | 8/1960 | Great Britain | 260—524 |

LORRAINE A. WEINBERGER, Primary Examiner

R. S. WEISSBERG, Assistant Examiner

U.S. Cl. X.R.

260—524 M